(12) United States Patent
Zhang et al.

(10) Patent No.: US 11,444,730 B2
(45) Date of Patent: Sep. 13, 2022

(54) BANDWIDTH PART (BWP) AND POWER SCHEDULING METHOD AND APPARATUS FOR INDOOR TERAHERTZ

(71) Applicant: University of Science and Technology Beijing, Beijing (CN)

(72) Inventors: Haijun Zhang, Beijing (CN); Xiangnan Liu, Beijing (CN); Keping Long, Beijing (CN)

(73) Assignee: UNIVERSITY OF SCIENCE AND TECHNOLOGY BEIJING, Beijing (CN)

(*) Notice: Subject to any disclaimer, the term of this patent is extended or adjusted under 35 U.S.C. 154(b) by 0 days.

(21) Appl. No.: 17/138,949

(22) Filed: Dec. 31, 2020

(65) Prior Publication Data

US 2022/0140961 A1 May 5, 2022

(30) Foreign Application Priority Data

Oct. 29, 2020 (CN) .......................... 202011187720.5

(51) Int. Cl.
*H04L 5/00* (2006.01)
*H04W 72/04* (2009.01)
*H04W 72/12* (2009.01)

(52) U.S. Cl.
CPC ............ *H04L 5/0023* (2013.01); *H04L 5/006* (2013.01); *H04L 5/0037* (2013.01);
(Continued)

(58) Field of Classification Search
CPC ..... H04L 5/0023; H04L 5/0037; H04L 5/006; H04L 5/00; H04L 27/06; H04L 45/00;
(Continued)

(56) References Cited

U.S. PATENT DOCUMENTS

2011/0244786 A1* 10/2011 Fujii .................... H01Q 19/104
455/7
2014/0300955 A1* 10/2014 Watanabe .............. G02B 5/008
359/350
(Continued)

FOREIGN PATENT DOCUMENTS

CN       112533274 A    *  3/2021
WO       WO2021221183   *  4/2021
WO       WO-2021221183 A1 * 11/2021

*Primary Examiner* — Wutchung Chu
(74) *Attorney, Agent, or Firm* — Bayramoglu Law Offices LLC (57) ABSTRACT

A bandwidth part (BWP) and power scheduling method and apparatus for indoor terahertz are provided. The BWP and power scheduling method uses an intelligent reflecting surface (IRS) and a non-orthogonal multiple access (NOMA) to compensate for a shortcoming, wherein terahertz waves are not suitable for an indoor transmission, convert an indoor environment of an IRS-assisted terahertz propagation into a channel model, and convert an optimal wireless resource scheduling in an indoor IRS-assisted terahertz system into a functional optimization design with random constraints. Policies and corresponding actions are trained by using a proximal policy optimization (PPO) to schedule a power and a BWP. An actor part generates continuous a power scheduling, and a critic part generates a discrete BWP scheduling.

5 Claims, 3 Drawing Sheets

(52) U.S. Cl.
CPC ... *H04W 72/0493* (2013.01); *H04W 72/1231* (2013.01); *H04W 72/1257* (2013.01)

(58) Field of Classification Search
CPC ..... H04L 27/22; H04L 47/10; H04L 41/0896; H04L 5/001; H04L 5/0053; H04L 27/26; H04L 47/822; H04L 5/0007; H04L 5/0048; H04W 72/0493; H04W 72/1231; H04W 72/1257; H04W 52/241; H04W 24/06; H04W 24/02; H04W 52/42; H04W 72/044; H04W 16/26; H04W 52/34; H04W 52/0206; H04W 36/06; H04W 72/0453; H04W 16/14; H04W 72/0473; H04W 52/146; H04W 16/10; H04B 7/022; H04B 7/0408; H04B 7/06; H04B 7/08; H04B 17/345; H04B 7/15507; H04B 10/505; H04B 17/382; H04B 10/90; H04B 7/0413
See application file for complete search history.

(56) References Cited

U.S. PATENT DOCUMENTS

2021/0167512 A1* 6/2021 Lee .................... H01Q 3/30
2021/0368437 A1* 11/2021 Kim .................. H04W 52/0212

* cited by examiner

BANDWIDTH PART (BWP) AND POWER SCHEDULING METHOD AND APPARATUS FOR INDOOR TERAHERTZ

CROSS-REFERENCE TO RELATED APPLICATIONS

This application is based upon and claims priority to Chinese Patent Application No. 202011187720.5, filed on Oct. 29, 2020, the entire contents of which are incorporated herein by reference.

TECHNICAL FIELD

The present invention relates to the technical field of mobile communications, and in particular, to a bandwidth part (BWP) and power scheduling method and apparatus for indoor terahertz based on proximal policy optimization (PPO) dual training in an intelligent reflecting surface (IRS)-assisted scene.

BACKGROUND

In the development of wireless communications technologies, spectrum resources have always been scarce and precious resources. Nowadays, as one of the key wireless communication technologies, millimeter waves have received extensive attention from the industry and academia. In the upcoming 6G era, terahertz will trigger a revolutionary development of science and technology with its higher bandwidth and narrower beam. However, during propagation of terahertz waves in the air, water molecules may cause a transmission loss. Therefore, terahertz communication is more suitable for short-distance communication. However, there are many obstacles in an indoor environment, such as furniture, electrical appliances and moving people, while terahertz waves have an extremely short wavelength. As a result, the communication blocking effect is severe indoor.

To solve the above problem, an intelligent reflecting surface (IRS), as a new technology, can intelligently reconfigure transmitted signals by integrating a large number of relatively inexpensive passive reflective elements on a plane, thereby significantly improving the reflectivity and the performance of a wireless communication network. In some studies, it is proposed to establish a simultaneous wireless information and power transmission system assisted by an IRS, to improve energy harvesting performance. In addition, compared with the traditional orthogonal multiple access technology, the non-orthogonal multiple access (NOMA) technology can provide higher throughput load and user requirements, thereby improving the performance of the entire system.

However, in terms of resource scheduling, the existing technology mainly focuses on power scheduling, and ignores scheduling of the bandwidth part (BWP). From the perspective of radio frequency signal processing, use of a wide bandwidth may cause unnecessary power consumption, making it difficult to use resources rationally, thus affecting economic benefits.

SUMMARY

An objective of the present invention is to provide a bandwidth part (BWP) and power scheduling method and apparatus for indoor terahertz, to implement scheduling of power and BWP resources by using an actor-critic structure of a proximal policy optimization (PPO) algorithm, and accelerate training by introducing primal duals, thereby realizing rational scheduling of indoor bandwidth and power resources, while ensuring the maximum economic benefits and energy efficiency of equipment suppliers.

To achieve the above purpose, the present invention provides the following technical solutions.

In one aspect, a BWP and power scheduling method for indoor terahertz includes the following steps:

S1: initializing parameters and states of a wireless access device, users, and an intelligent reflecting surface (IRS), including an initial transmit power $p_0$, a policy parameter $\theta_0 := \{\mu_0, \sigma_0\}$, and Lagrange multipliers $\lambda_0, \phi_0$;

S2: extracting samples $\hat{x}_1, \hat{x}_2, \hat{\theta}$ from a truncated standard normal distribution;

S3: calculating a terahertz path loss $L(f,d)$ and a channel gain $h_{j,k}$, including a transmission path from the wireless access device to each user, and a transmission path from the wireless access device to each user through reflection by the IRS:

S4: inputting initial conditions to a resource scheduling formula;

S5: inputting a channel state obtained from a channel state matrix $H_{JK}$ to a PPO algorithm;

S6: calculating an estimate of gradient according to an obtained new policy parameter set $\theta$ and a generated scheduling action;

S7: updating primal-dual variables by using a primal-dual optimization algorithm, until a reward converges;

S8: outputting an action obtained after learning, a scheduled BWP factor $\beta$ and power p, and a final system performance function $f_0(x)$;

S9: traversing all the users, and repeating step S2 to step S7, to complete scheduling for all the users; and S10: terminating a method process, and fetching data.

Preferably, in step S3, channel estimations are integrated:

$$H_{j,k} @ H_{LOS,j,k} + H_{j,r} \Phi H_{r,k},$$

to unify the two transmission paths;

$H_{j,k}$ is a channel gain from the wireless access device to the user, $H_{r,k}$ is a channel gain from the IRS to the user, $H_{j,r}$ is a channel gain from the wireless access device to the IRS, $\Phi$ is a phase transition matrix, and $H_{LOS,j,k}$ is a channel gain without passing through IRS.

Preferably, in step S4, the resource scheduling formula is expressed as a long-term instantaneous system performance function using an ergodic mean x capture system: $x \leq E[f(p(h),h)]$, where $f(p(h),h)$ is an instantaneous performance function.

Preferably, in step S5, the channel state is inputted to an actor part and a critic part of the PPO algorithm, where the actor part generates a new policy function, and selects a Gaussian policy to output a choice for scheduling of an action, and the critic part generates a new action according to an original Q value function, to schedule a BWP factor.

Preferably, in step S6, the estimate of gradient is calculated according to the obtained new policy parameter set θ and the generated scheduling action:

$$\hat{\nabla} f_0(x_0) := \frac{\hat{f}_0(x_0 + \alpha_1 \hat{x}_1) - \hat{f}_0(x_0)}{\alpha_1} \hat{x}_1,$$

$$\hat{\nabla} f_2(x_0) := \frac{\hat{f}_2(x_0 + \alpha_2 \hat{x}_2) - \hat{f}_2(x_0)}{\alpha_2} \hat{x}_2^T,$$

$$\hat{\nabla}_\theta E[f_1(\pi(h, \theta), h)] := \frac{\hat{f}_1(\pi(h, \theta_0 + \alpha_3 \hat{\theta}), h) - \hat{f}_1(\pi(h, \theta_0), h)}{\alpha_3} \hat{\theta}^T;$$

where $x_0$ is a given point, $\hat{x}_1$, $\hat{x}_2$, $\hat{\theta}$ are sampling points, $\alpha_1, \alpha_2, \alpha_3$ are iteration factors of a gradient estimation; h is a channel state; $\pi(h,\theta)$ is an allocation policy; $\hat{f}_1 \pi(h,\theta), h)$ is an observation value of an instantaneous system performance function; $\hat{f}_2(x_0)$ is an observation value of a constraint function; $\hat{\zeta}_0(x_0)$ is an observation value of a target function; and $\hat{\nabla} f_0(x_0)$, $\hat{\nabla} f_2(x_0)$, $\hat{\nabla}_\theta E[f_1(\pi(h,\theta),h)]$ is a gradient observation value obtained through calculation; and in step S7, Lagrangian operators $\lambda_{k+1}$ and $\phi_{k+1}$ are updated based on step sizes $\gamma_1, \gamma_2, \gamma_3, \gamma_4$, and a Lagrangian operator updating formula is as follows:

$$\theta_{k+1} = \theta_k + \gamma_1 \hat{\nabla}_\theta E[f_1(\pi(h, \theta_k), h) \lambda_k],$$

$$x_{k+1} = x_k + \gamma_2 (\hat{\nabla} f_0(x_k) + \hat{\nabla} f_2(x_k) \phi_k - 1),$$

$$\lambda_{k+1} = \lambda_k - \gamma_3 (\hat{f}_1(\pi(h, \theta_{k+1}), h) - x_{k+1}),$$

$$\phi_{k+1} = \phi_k - \gamma_4 \hat{f}_2(x_{k+1}),$$

where h is a channel state; $f_1(\pi(h,\theta),h)$ is an instantaneous data transmission rate; $\pi(h,\theta)$ is an instantaneous transmit power; $\theta_k$ is a parameter set of the $k^{th}$ cycle; $x_k$ is an ergodic mean of the $k^{th}$ cycle; and $\lambda_k, \phi_k$ are Lagrange multipliers of the $k^{th}$ cycle.

In another aspect, a BWP and power scheduling apparatus for indoor terahertz includes: an initialization module, configured to initialize parameters and states of a wireless access device, users, and an IRS, including an initial transmit power $p_0$, a policy parameter $\theta_0 := \{\mu_0, \sigma_0\}$, and Lagrange multipliers $\lambda_0, \phi_0$;

a sample extraction module, configured to extract samples $\hat{x}_1, \hat{x}_2, \hat{\theta}$ from a truncated standard normal distribution;

a path loss and channel gain calculation module, configured to calculate a terahertz path loss L(f,d) and a channel gain $h_{j,k}$, including a transmission path from the wireless access device to each user, and a transmission path from the wireless access device to each user through reflection by the IRS;

an initial condition input module, configured to input initial conditions to a resource scheduling formula;

a channel state input module, configured to input a channel state obtained from a channel state matrix $H_{JK}$ to a PPO algorithm;

a gradient estimation module, configured to calculate an estimate of gradient according to an obtained new policy parameter set θ and a generated scheduling action;

a policy updating module, configured to update primal-dual variables by using a primal-dual optimization algorithm, until a reward converges;

an output module, configured to output an action obtained after learning, a scheduled BWP factor β and power p, and a final system performance function $f_0(x)$;

a traversing module, configured to traverse all the users to complete scheduling for all the users; and a termination module, configured to terminate a method process, and fetch data.

Preferably, the path loss and channel gain calculation module is specifically configured to integrate channel estimations:

$$H_{j,k} @ H_{LOS,j,k} + H_{j,r} \Phi H_{r,k},$$

to unify the two transmission paths;

where $H_{j,k}$ is a channel gain from the wireless access device to the user, $H_{r,k}$ is a channel gain from the IRS to the user, $H_{j,r}$ is a channel gain from the wireless access device to the IRS, $\Phi$ is a phase transition matrix, and $H_{LOS,j,k}$ is a channel gain without passing through IRS.

Preferably, the resource scheduling formula is expressed as a long-term instantaneous system performance function using an ergodic mean x capture system: $x \leq E[f(p(h),h)]$, where f(p(h),h) is an instantaneous performance function.

Preferably, the channel state input module is specifically configured to input the channel state to an actor part and a critic part of the PPO algorithm, where the actor part generates a new policy function, and selects a Gaussian policy to output a choice for scheduling of an action, and the critic part generates a new action according to an original Q value function, to schedule a BWP factor.

Preferably, the gradient estimation module is specifically configured to calculate the estimate of gradient according to the obtained new policy parameter set θ and the generated scheduling action:

$$\hat{\nabla} f_0(x_0) := \frac{\hat{f}_0(x_0 + \alpha_1 \hat{x}_1) - \hat{f}_0(x_0)}{\alpha_1} \hat{x}_1,$$

$$\hat{\nabla} f_2(x_0) := \frac{\hat{f}_2(x_0 + \alpha_2 \hat{x}_2) - \hat{f}_2(x_0)}{\alpha_2} \hat{x}_2^T,$$

$$\hat{\nabla}_\theta E[f_1(\pi(h, \theta), h)] := \frac{\hat{f}_1(\pi(h, \theta_0 + \alpha_3 \hat{\theta}), h) - \hat{f}_1(\pi(h, \theta_0), h)}{\alpha_3} \hat{\theta}^T;$$

where $x_0$ is a given point, $\hat{x}_1$, $\hat{x}_2$, $\hat{\theta}$ are sampling points, $\alpha_1, \alpha_2, \alpha_3$ are iteration factors of a gradient estimation; h is a channel state; $\pi(h,\theta)$ is an allocation policy; $\hat{f}_1(\pi(h,\theta),h)$ is an observation value of an instantaneous system performance function; $\hat{f}_2(x_0)$ is an observation value of a constraint function; $\hat{f}_0(x_0)$ is an observation value of a target function; and $\hat{\nabla} f_0(x_0)$, $\hat{\nabla} f_2(x_0)$, $\hat{\nabla}_\theta E[f_1(\pi(h,\theta),h)]$ is a gradient observation value obtained through calculation; and in the policy updating module, Lagrangian operators $\lambda_{k+1}$, and $\phi_{k+1}$, are updated based on step sizes $\gamma_1, \gamma_2, \gamma_3, \gamma_4$, and a Lagrangian operator updating formula is as follows:

$$\theta_{k+1} = \theta_k + \gamma_1 \hat{\nabla}_\theta E[f_1(\pi(h, \theta_k), h) \lambda_k],$$

$$x_{k+1} = x_k + \gamma_2 (\hat{\nabla} f_0(x_k) + \hat{\nabla} f_2(x_k) \phi_k - 1),$$

$$\lambda_{k+1} = \lambda_k - \gamma_3 (\hat{f}_1(\pi(h, \theta_{k+1}), h) - x_{k+1}),$$

$$\phi_{k+1} = \phi_k - \gamma_4 \hat{f}_2(x_{k+1}),$$

where h is a channel state; $f_1(\pi(h,\theta),h)$ is an instantaneous data transmission rate; $\pi(h,\theta)$ is an instantaneous transmit power; $\theta_k$ is a parameter set of the $k^{th}$ cycle; $x_k$ is an ergodic mean of the $k^{th}$ cycle; and $\lambda_k, \phi_k$ are Lagrange multipliers of the $k^{th}$ cycle.

Technical solutions provided in the embodiments of the present invention achieve at least the following beneficial effects:

In the present invention, an optimization design for continuous power and discrete BWP is realized jointly by using the actor-critic structure of the proximal policy optimization algorithm, an optimal solution for scheduling of the two types of resources is obtained by using gradient-assisted primal duals, and then an iterative BWP and power joint scheduling algorithm is proposed to maximize the information transmission rate and economic benefits. The present invention not only can schedule indoor bandwidth and power resources rationally, but also can maximize the economic benefits and energy efficiency.

BRIEF DESCRIPTION OF THE DRAWINGS

In order to describe the technical solutions of the embodiments of the present invention more clearly, the accompanying drawings required for describing the embodiments are briefly described below. Apparently, the accompanying drawings described below are only some embodiments of the present invention. Those of ordinary skill in the art may further obtain other accompanying drawings based on these accompanying drawings without creative efforts.

DETAILED DESCRIPTION OF THE EMBODIMENTS

In order to make the objectives, technical solutions and advantages of the present invention clearer, embodiments of the present invention will be further described in detail below with reference to the accompanying drawings.

Figure 1:
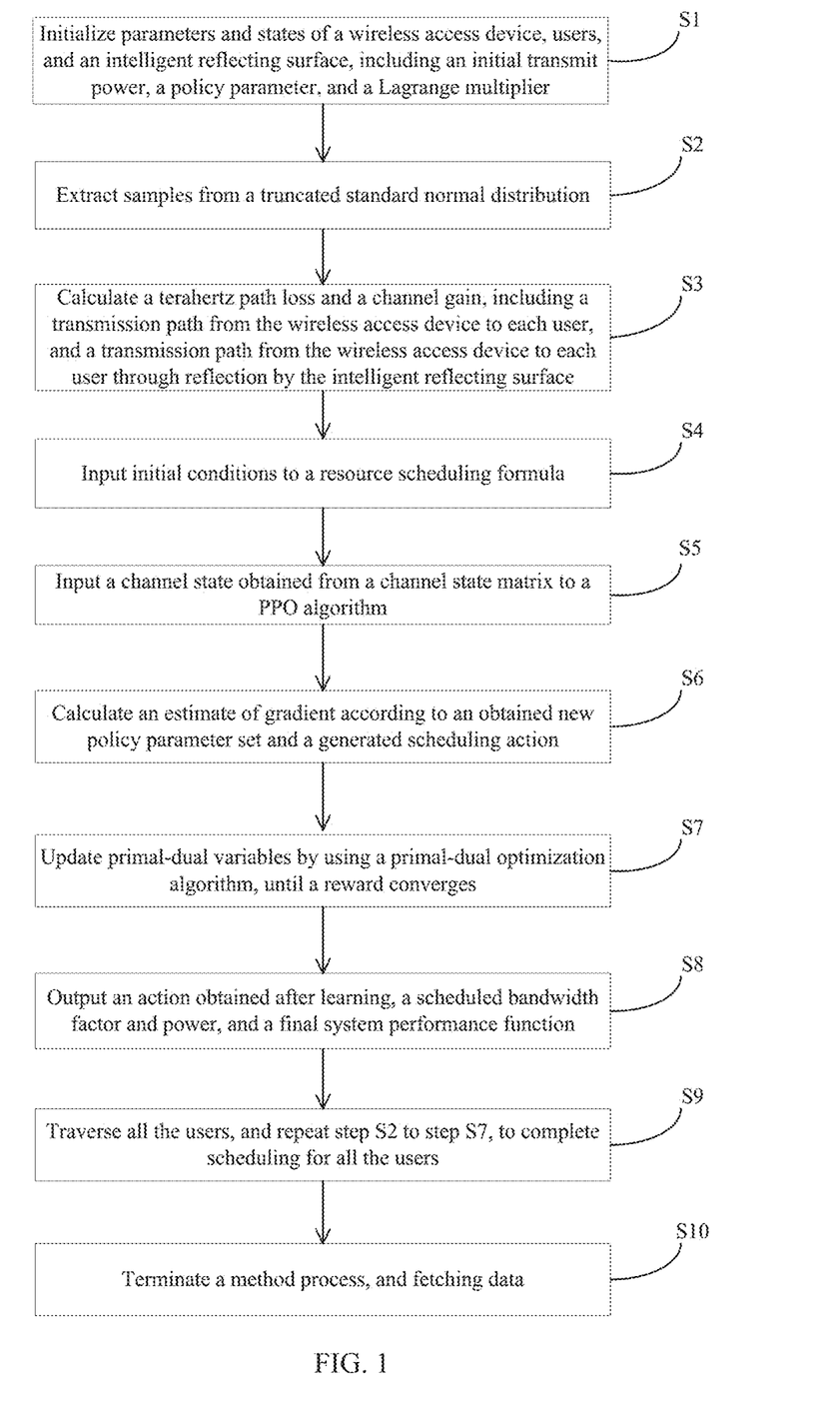
FIG. 1 is a flowchart of a BWP and power scheduling method for indoor terahertz according to an embodiment of the present invention.

An embodiment of the present invention first provides a BWP and power scheduling method for indoor terahertz. As shown in FIG. 1, the method includes the following steps:

S1: initializing parameters and states of a wireless access device (AP), users, and an intelligent reflecting surface (IRS), including an initial transmit power $p_0$, a policy parameter $\theta_0 := \{\mu_0, \sigma_0\}$, and Lagrange multipliers $\lambda_0, \phi_0$;

S2: extracting samples $\hat{x}_1, \hat{x}_2, \hat{\theta}$ from a truncated standard normal distribution;

S3: calculating a terahertz path loss $L(f,d)$ and a channel gain $h_{j,k}$, including a transmission path from the wireless access device to each user, and a transmission path from the wireless access device to each user through reflection by the IRS;

S4: inputting initial conditions to a resource scheduling formula;

S5: inputting a channel state obtained from a channel state matrix $H_{JK}$ to a PPO algorithm;

S6: calculating an estimate of gradient according to an obtained new policy parameter set $\theta$ and a generated scheduling action;

S7: updating primal-dual variables by using a primal-dual optimization algorithm, until a reward converges;

S8: outputting an action obtained after learning, a scheduled BWP factor $\beta$ and power p, and a final system performance function $f_0(x)$;

S9: traversing all the users, and repeating step S2 to step S7, to complete scheduling for all the users; and S10: terminating a method process, and fetching data.

The present invention proposes a novel joint resource scheduling mechanism for the future development of 6G wireless indoor networks. Optimization for continuous power and discrete BWP is realized jointly by using an actor-critic structure of the proximal policy optimization (PPO) algorithm, an optimal solution for scheduling of the two types of resources is obtained by using gradient-assisted primal duals, and then an iterative BWP and power joint scheduling algorithm is proposed to maximize the information transmission rate and economic benefits. The method in the present invention not only can schedule indoor bandwidth and power resources rationally, but also can maximize the economic benefits and energy efficiency.

Figure 2:
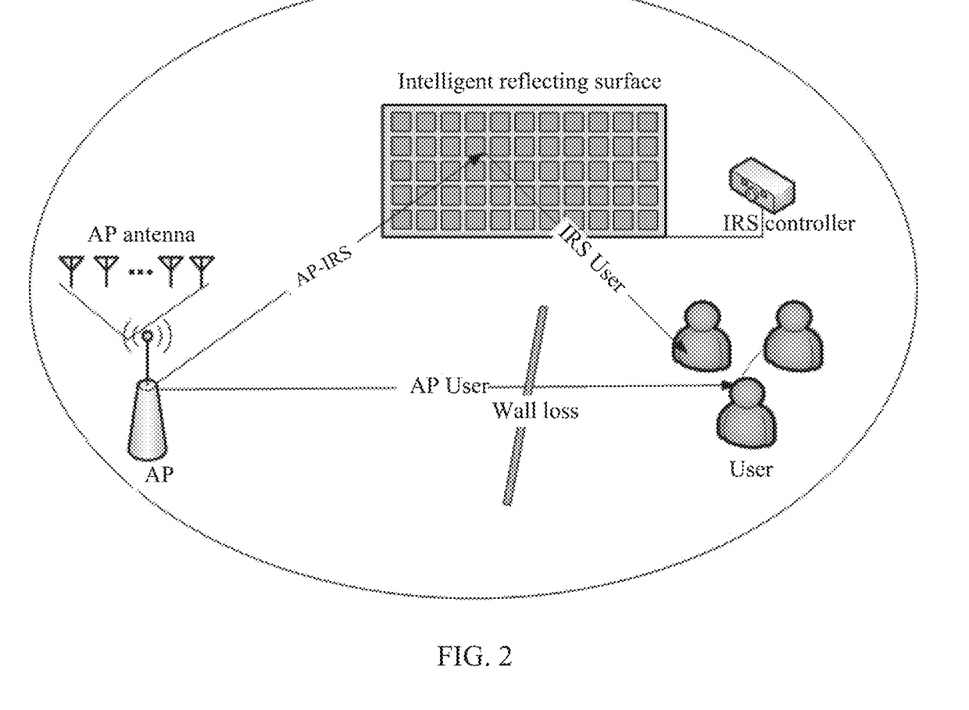
FIG. 2 is schematic diagram of an application scenario according to an embodiment of the present invention.

Specifically, one AP with a plurality of antennas and a plurality of indoor users are taken into consideration in the system of the present invention. As shown in FIG. 2, the system includes an AP equipped with a plurality of antennas, a plurality of indoor users, and a preset IRS. A set J represents the number of antennas, and a set K represents the number of users. Considering an application scenario (downlink) where the indoor AP communicates with the users by using the IRS, a frequency band of 1 THz is used, and an access technology is NOMA.

An initial signal from the AP to a user k is $s_k$, and a corresponding precoding matrix is defined as $F_k$; then, it can be obtained that a transmitted signal x from the AP is:

$$x = \sum_{k=1}^{K_I} F_k s_k$$

Then, a signal received through the IRS is considered. In such a case, there are two transmission links, where $H_{LOS,j,k}$ represents direct transmission without passing through the IRS, and $H_{j,r} \Phi H_{r,k}$ represents indirect transmission through the IRS plane. The two transmission links characterize the established system status.

Obviously, compared with the latter, $H_{LOS,j,k}$ is weak due to the high frequency of terahertz. After transmission over the link, a received signal $y_k$ of a $k^{th}$ user is:

$$y_k = \sum_{j=1}^{J} (H_{LOS,j,k} + H_{j,r} \Phi H_{r,k}) x_k + n_k$$

$H_{j,k}$ is a channel gain from the AP to the user, and $H_{r,k}$ is a channel gain from the IRS to the user; $H_{j,r}$ is a channel gain from the AP to the IRS; $\Phi$ is a phase transition matrix; $H_{LOS,j,k}$ is a channel gain without passing through the IRS; and $n_k$ is white Gaussian noise, which satisfies $C \mathcal{N}(0, \sigma^2)$.

For ease of the subsequent calculation of an information transmission rate $R_k$ of the user, simplification processing is made below:

$$H_{j,k} @ H_{LOS,j,k} + H_{j,r} \Phi H_{r,k}$$

Because the IRS is a plane, an antenna response vector of the IRS should be calculated based on a uniform planar array instead of a uniform linear array. Therefore, in a steering vector, a response with unit energy of an element in the IRS may be expressed as the following formula:

$$a(\Phi, \theta) = \frac{1}{\sqrt{MN}}\left[1, \ldots, e^{j\frac{2\pi}{\lambda}d(m\cos\phi_{il}\cos\theta_{il}+n\sin\phi_{il}\sin\theta_{il})}, \ldots, \right.$$
$$\left. e^{j\frac{2\pi}{\lambda}d((N-1)\cos\phi_{il}\cos\theta_{il}+(M-1)\sin\phi_{il}\sin\theta_{il})}\right]^T$$

m and n are antenna element indexes; $\lambda$ is a wavelength; $\phi$ and $\theta$ represent an azimuth angle and an elevation angle of an incident signal; N represents the total number of antennas (the number of IRS reflection factors); d is an antenna spacing, which is generally set to $$d = \frac{1}{4}\lambda.$$

$$H_{JK} = \sqrt{\frac{N_t N_r}{N_{clu} N_{ray}}} \sum_{i=0}^{N_{clu}-1} \sum_{l=0}^{N_{ray}^i-1} \alpha_{il} a_r(\phi_{il}^r, \theta_{il}^r) a_t(\phi_{il}^t, \theta_{il}^t)^H$$

$N_t$ represents the number of transmit antennas, $N_r$ represents the number of receive antennas, $a_{il}$ represents a fading coefficient of a channel; $N_{clu}$ and $N_{ray}^i$ are clusters of a square antenna array and paths within each cluster.

With reference to the above formula, the channel gains can be expressed in the following manner:

$$H_{JK} = \begin{bmatrix} h_{11} & h_{12} & \ldots & h_{1K} \\ h_{21} & h_{22} & \ldots & h_{2K} \\ \vdots & \vdots & \ddots & \vdots \\ h_{JI} & h_{J2} & \ldots & h_{JK} \end{bmatrix}$$

Each row represents an index of an antenna of the AP, and each column represents an index of a current user.

In addition, the molecular absorption loss of terahertz cannot be ignored. Therefore, a direct path gain comes from a spread loss $L_{spread}$ and a molecular absorption loss $L_{abs}$.

$$L(f, d) = L_{spread}(f, d) L_{abs}(f, d)$$
$$L_{spread}(f, d) = \left(\frac{c}{4\pi f d}\right)^2 \text{ and } L_{abs}(f, d) = e^{-k_{abs}(f)d};$$

from the molecular perspective, $L_{abs}$ depends on the condition of a transmission medium.

By using an ergodic mean capture system, a wireless resource scheduling problem can be converted into a long-term instantaneous performance function:

$$x \leq E[f(p(h),h)]$$

f(p(h),h) is an instantaneous performance function. The goal of system design is to select resource scheduling p(h) to maximize an ergodic variable x. The average variable x reflects the performance of the wireless communication system over a long period of time and is affected by instantaneous resource scheduling.

In the system design of the present invention, h is a channel state, p(h) is an instantaneous transmit power, and $f_1(p(h),h)$ is an instantaneous data transmission rate. The design goal is to maximize the ergodic rate average vector x of the power scheduling p(h) under power constraints.

$$\max f_o(x)$$
$$x \leq E[f_1(p(h),h)], f_2(x) \geq 0$$

s.t.

$$x \in \chi, p \in P$$

At the receiving end, a serial interference cancellation (SIC) technology is used for multi-user detection. At the transmitting end, signals of different users on the same sub-channel are transmitted using a power multiplexing technology, and signal powers of different users are scheduled according to related algorithms, so that each user corresponds to a different signal power at the receiving end. The receiver performs interference cancellation in a specific sequence according to different signal powers, to achieve correct demodulation. The SIC technology can also achieve the purpose of distinguishing different users. An instantaneous response function $f_{1,k}$ ($h_k$, $p_k(h_k)$) is about the calculation of capacity.

$$f_{l,k}(h_k, p_k(h_k)) = \log\left(1 + \frac{h_{kk} p_k(h_k)}{1 + \sum_{l=k-1}^{l \neq k} h_{kk} p_l(h_k)}\right)$$

A limited function $f_2(x)$ needs to be defined as follows:

$$f_2(x) = p_{max} - E_h\left[\sum_{k=1}^{K} \pi_k(h, \theta)\right]$$

Therefore, the problem becomes as follows:

$$\max \sum_k \log(x_k)$$
$$\text{s.t. } x \leq E\left[\log\left(1 + \frac{h_{kk} \pi_k(h, \theta)}{1 + \sum_{l=k-1}^{l \neq k} h_{kk} \pi_k(h, \theta)}\right)\right]$$
$$p_{max} - E_h\left[\sum_{k=1}^{K} \pi_k(h, \theta)\right] \geq 0$$
$$x \in \chi, \theta \in \Theta$$

For the above system, the value-based method in reinforcement learning is insufficient to deal with problems in a restricted state. When a state in a state space is described by using features, due to limitations of individual observation or modeling limitations, two states that are originally different in a real environment may have the same feature description after modeling. As a result, the value-based method may fail to obtain the optimal solution. Therefore, the present invention mainly uses a policy-based method, assisted with the value-based method.

The conventional policy-based solution is as follows:

$$\hat{\nabla}_\theta E_h f_1(\pi(h,\theta),h) = \hat{f}_1(\hat{p}_\theta, h) \nabla_\theta \log \pi_{h,\theta}(\hat{p}_\theta)$$

The defect of this conventional method lies in an update step size $\gamma_1$. When the step size is inappropriate, parameters after update become worse, which easily causes a worse result after learning. Therefore, it is necessary to find a suitable step size, to ensure that a reward function increases monotonically after each update. In this case, the PPO solves this problem by introducing relative entropy in policy update.

The PPO is an actor-critic structure, where the actor part intends to maximize $J_{PPO}(\theta)$:

$$J_{PPO}(\theta) = \sum_{i=1}^{Iter} = (\pi(h,\theta)/\pi_{old}(h,\theta))A(h,\theta) - \lambda D_{KL}(\pi(h,\theta)/\pi_{old}(h,\theta))$$

However, the actor part needs to modify a new policy according to an advantage function $A(h,\theta)$ on the basis of an old policy. With a high advantage function $A(h,\theta)$, a modification range is large, making the new policy more likely to occur. Moreover, a KL penalty term is added, and $\lambda$ is set to 0.95 in this method.

The corresponding advantage function $A(h,\theta)$ expresses an advantage of an action P relative to the average in state h.

$$A(h,\theta) = E_h f_1'(\pi(h,\theta),h) - E_h f_1(\pi(h,\theta),h)$$

$f_1'(\pi(h,\theta),h)$ is an instantaneous performance function calculated after a new power is scheduled in the channel state h, and $f_1(\pi(h,\theta),h)$ is an instantaneous performance function under an originally scheduled power in the channel state h.

In selection of a penalty function of the actor part, PPO2 is used in the present invention:

$$L^{CLIP}(\theta) = E_t[\min(r_t(\theta)\hat{f}_1(\hat{p}_\theta,h), \mathrm{clip}(r_t(\theta),1-\varepsilon,1+\varepsilon)\hat{f}_1(\hat{p}_\theta,h))]$$

where $$r_t(\theta) = \frac{\pi(h,\theta)}{\pi_{old}(h,\theta)};$$

in this case, a small distribution difference between two updates is ensured.

For the critic part, the penalty hit is to perform BWP scheduling on a value of an instantaneous performance function calculated from an outputted action. Because the critic part adopts the idea of deep Q learning network, the outputted instantaneous performance function needs to be discretized. A specific principle is as follows:

$$\beta = \{\beta_1, \beta_2, \ldots, \beta_n\}$$

$\beta$ is the number of BWP available for scheduling. The update conditions take the following principle into consideration: the outputted performance function $f_1(g)$ satisfies the condition as follows:

$$\beta_{n+1} \leftarrow \beta_n, f_1(g) \geq \beta_n R_0$$

$R_0$ is an average data rate available for transmission per unit BWP.

A request access rate of the user may be expressed by a ZipF distribution as follows:

$$R_{request} = 1/n^\alpha f_1(g)$$

typically, $\alpha$ is 0.56. $R_{request}$ is also called user request profile.

By introducing parameterization to the previous system, the formula becomes as follows:

$$\max f_0(x)$$
$$\text{s.t.} \quad x \leq E[f_1(\pi(h,\theta),h)], \, f_2(x) \geq 0$$
$$x \in \chi, \, p \in P$$

The utility function $f_0(x)$ is considered as a weighted operation, $$f_0(x) = \Sigma_k w_k(x_k)$$

A limited function $f_2(x)$ needs to be defined as follows:

$$f_2(x) = p_{max} - E_h\left[\sum_{k=1}^K \pi_k(h,\theta)\right]$$

For convenience, the Lagrangian function of the system is still as follows:

$$L(\theta, x, \lambda, \mu) = f_0(x) + \phi^T f_2(x) + \lambda^T(E[f_1(\pi(h,\theta),h)] - x)$$

Gradients of the four parameters are calculated in sequence.

$$\theta_{k+1} = \theta_k + \gamma_1 \hat{\nabla}_\theta E[f_1(\pi(h,\theta_k),h)\lambda_k]$$
$$x_{k+1} = x_k + \gamma_2(\hat{\nabla} f_0(x_k) + \hat{\nabla} f_2(x_k)\phi_k - 1)$$
$$\lambda_{k+1} = \lambda_k - \gamma_3(\hat{f}_1(\pi(h,\theta_{k+1}),h) - x_{k+1})$$
$$\phi_{k+1} = \phi_k - \gamma_4 \hat{f}_2(x_{k+1})$$

Then, the update in the original primal-dual variable formula is replaced with a zero-gradient update. The zero-gradient estimation may be completed by means of finite difference, in which an unbiased gradient estimation of a given point is constructed through random observations. A gradient estimation with finite difference may be constructed by using function observation values at given points $x_0$ and $\theta_0$, and sampling points $\hat{x}_1, \hat{x}_2, \hat{\theta}$ $$\hat{\nabla} f_0(x_0) := \frac{\hat{f}_0(x_0 + \alpha_1 \hat{x}_1) - \hat{f}_0(x_0)}{\alpha_1} \hat{x}_1$$
$$\hat{\nabla} f_2(x_0) := \frac{\hat{f}_2(x_0 + \alpha_2 \hat{x}_2) - \hat{f}_2(x_0)}{\alpha_2} \hat{x}_2^T$$
$$\hat{\nabla}_\theta E[f_1(\pi(h,\theta),h)] := \frac{\hat{f}_1(\pi(h,\theta_0 + \alpha_3 \hat{\theta}),h) - \hat{f}_1(\pi(h,\theta_0),h)}{\alpha_3} \hat{\theta}^T$$

$\alpha_1, \alpha_2, \alpha_3$ are iteration factors of the gradient estimation, and $\gamma_1, \gamma_2, \gamma_3, \gamma_4$ are the primal dual upgrading steps. In the present invention, an optimization design for continuous power and discrete BWP is realized jointly by using the actor-critic structure of the proximal policy optimization algorithm, an optimal solution for scheduling of the two types of resources is obtained by using gradient-assisted primal duals, and then an iterative BWP and power joint scheduling algorithm is proposed to maximize the information transmission rate and economic benefits. The method in the present invention not only can schedule indoor bandwidth and power resources rationally, but also can maximize the economic benefits and energy efficiency.

Figure 3:
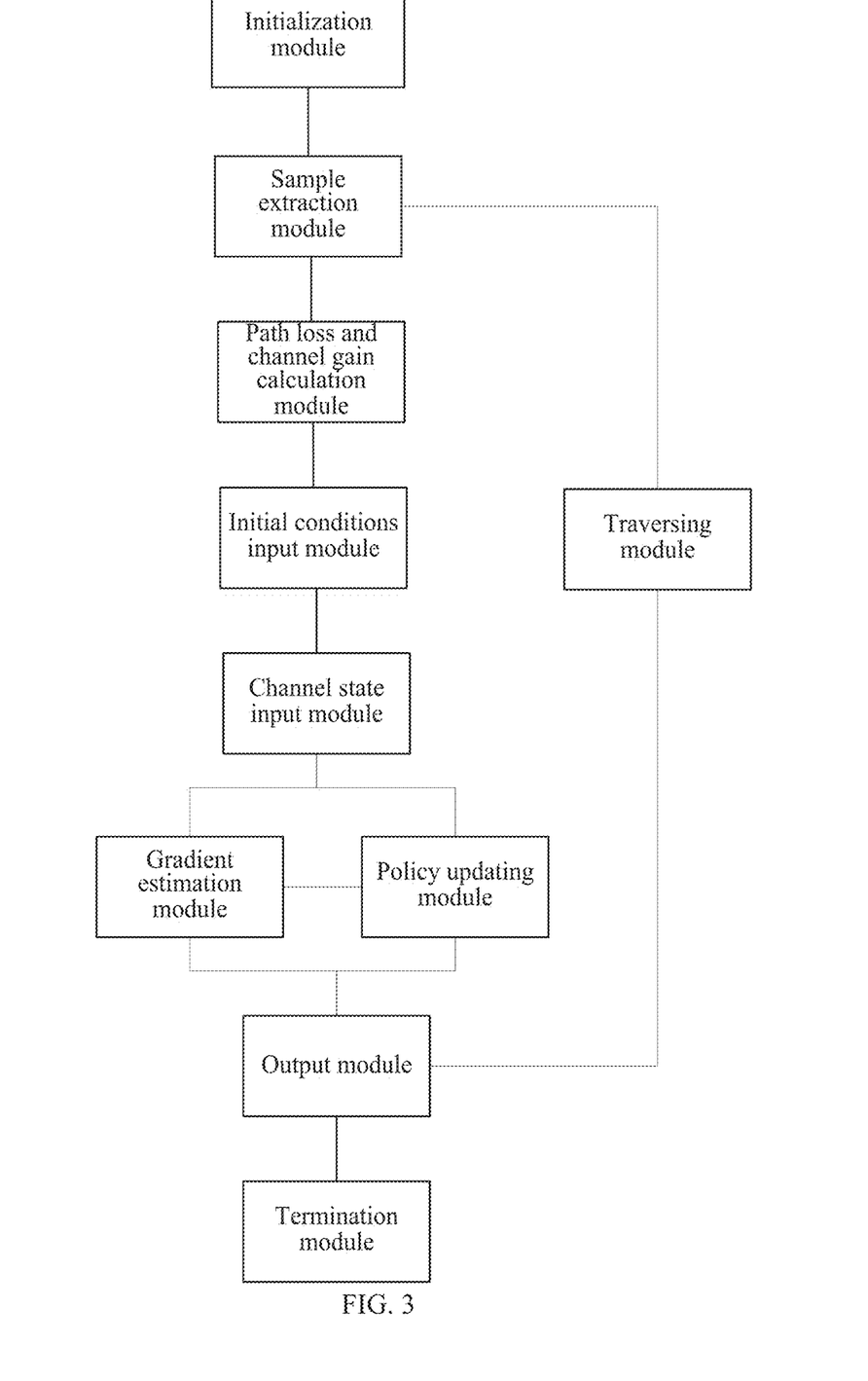
FIG. 3 is a schematic structural diagram of a BWP and power scheduling apparatus for indoor terahertz according to an embodiment of the present invention.

Correspondingly, an embodiment of the present invention further provides a BWP and power scheduling apparatus for indoor terahertz. As shown in FIG. 3, the apparatus includes:

an initialization module, configured to initialize parameters and states of a wireless access device, users, and an IRS, including an initial transmit power $p_0$, a policy parameter $\theta_0:=\{\mu_0,\sigma_0\}$, and Lagrange multipliers $\lambda_0,\phi_0$;

a sample extraction module, configured to extract samples $\hat{x}_1, \hat{x}_2, \hat{\theta}$ from a truncated standard normal distribution;

a path loss and channel gain calculation module, configured to calculate a terahertz path loss $L(f,d)$ and a channel gain $h_{j,k}$, including a transmission path from the wireless access device to each user, and a transmission path from the wireless access device to each user through reflection by the IRS;

an initial condition input module, configured to input initial conditions to a resource scheduling formula;

a channel state input module, configured to input a channel state obtained from a channel state matrix $H_{JK}$ to a PPO algorithm;

a gradient estimation module, configured to calculate an estimate of gradient according to an obtained new policy parameter set $\theta$ and a generated scheduling action;

a policy updating module, configured to update primal-dual variables by using a primal-dual optimization algorithm, until a reward converges;

an output module, configured to output an action obtained after learning, a scheduled BWP factor $\beta$ and power p, and a final system performance function $f_0(x)$;

a traversing module, configured to traverse all the users to complete scheduling for all the users; and a termination module, configured to terminate a method process, and fetch data.

Further, the path loss and channel gain calculation module is specifically configured to integrate channel estimations:

$$H_{j,k} @ H_{LOS,j,k} + H_{j,r}\Phi H_{r,k},$$

to unify the two transmission paths;

where $H_{j,k}$ is a channel gain from the wireless access device to the user, $H_{r,k}$ is a channel gain from the IRS to the user, $H_{j,r}$ is a channel gain from the wireless access device to the IRS, $\Phi$ is a phase transition matrix, and $H_{LOS,j,k}$ is a channel gain without passing through IRS.

The resource scheduling formula is expressed as a long-term instantaneous system performance function using an ergodic mean x capture system: $x \leq E[f(p(h),h)]$, where $f(p(h),h)$ is an instantaneous performance function.

Further, the channel state input module is specifically configured to: input the channel state to an actor part and a critic part of the PPO algorithm, where the actor part generates a new policy function, and selects a Gaussian policy to output a choice for scheduling of an action, and the critic part generates a new action according to an original Q value function, to schedule a BWP factor.

The gradient estimation module is specifically configured to calculate the estimate of gradient according to the obtained new policy parameter set $\theta$ and the generated scheduling action:

$$\hat{\nabla} f_0(x_0) := \frac{\hat{f}_0(x_0 + \alpha_1 \hat{x}_1) - \hat{f}_0(x_0)}{\alpha_1}\hat{x}_1,$$

-continued $$\hat{\nabla} f_2(x_0) := \frac{\hat{f}_2(x_0 + \alpha_2 \hat{x}_2) - \hat{f}_2(x_0)}{\alpha_2}\hat{x}_2^T,$$

$$\hat{\nabla}_\theta E[f_1(\pi(h,\theta),h)] := \frac{\hat{f}_1(\pi(h,\theta_0+\alpha_3\hat{\theta}),h) - \hat{f}_1(\pi(h,\theta_0),h)}{\alpha_3}\hat{\theta}^T;$$

where $x_0,\theta_0$ is a given point, $\hat{x}_1, \hat{x}_2, \hat{\theta}$ are sampling points, $\alpha_1,\alpha_2,\alpha_3$ are iteration factors of a gradient estimation; h is a channel state; $\pi(h,\theta)$ is an allocation policy; $\hat{f}_1(\pi(h,\theta),h)$ is an observation value of an instantaneous system performance function; $\hat{f}_2(x_0)$ is an observation value of a constraint function; $\hat{\nabla}_0(x_0)$ is an observation value of a target function; and $\hat{\nabla}f_0(x_0)$, $\hat{\nabla}f_2(x_0)$, $\hat{\nabla}_\theta E[f_1(\pi(h,\theta),h)]$ is a gradient observation value obtained through calculation; and in the policy updating module, Lagrangian operators $\lambda_{k+1}$, and $\phi_{k+1}$ are updated based on step sizes $\gamma_1,\gamma_2,\gamma_3,\gamma_4$, and a Lagrangian operator updating formula is as follows:

$$\theta_{k+1} = \theta_k + \gamma_1 \hat{\nabla}_\theta E[f_1(\pi(h,\theta_k),h)\lambda_k],$$

$$x_{k+1} = x_k + \gamma_2(\hat{\nabla}f_0(x_k) + \hat{\nabla}f_2(x_k)\phi_k - 1),$$

$$\lambda_{k+1} = \lambda_k - \gamma_3(\hat{f}_1(\pi(h,\theta_{k+1}),h) - x_{k+1}),$$

$$\phi_{k+1} = \phi_k - \gamma_4 \hat{f}_2(x_{k+1}),$$

where h is a channel state; $f_1(\pi(h,\theta),h)$ is an instantaneous data transmission rate; $\pi(h,\theta)$ is an instantaneous transmit power; $\theta_k$ is a parameter set of the $k^{th}$ cycle; $x_k$ is an ergodic mean of the $k^{th}$ cycle; and $\lambda_k,\phi_k$ are Lagrange multipliers of the $k^{th}$ cycle.

The BWP and power scheduling apparatus for indoor terahertz of the present invention not only can schedule indoor bandwidth and power resources rationally, but also can maximize the economic benefits and energy efficiency.

The above merely describes preferred embodiments of the present invention, but is not intended to limit the present invention. Any modifications, equivalent replacements or improvements made within the spirit and principle of the present invention shall fall within the protection scope of the present invention.

What is claimed is:

1. A bandwidth part (BWP) and power scheduling method for an indoor terahertz, comprising the following steps:
    S1: initializing parameters and states of a wireless access device, users, and an intelligent reflecting surface (IRS), wherein the parameters comprises an initial transmit power $p_0$, a policy parameter $\theta_0:=\{\mu_0,\sigma_0\}$, and Lagrange multipliers $\lambda_0,\phi_0$, wherein $\mu_0$ denotes expectation of an initial policy, and $\sigma_0$ denotes variance of the initial policy;
    S2: extracting samples $\hat{x}_1, \hat{x}_2, \hat{\theta}$ a truncated standard normal distribution;
    S3: calculating a terahertz path loss $L(f,d)$ and a channel gain $h_{j,k}$, wherein paths comprises a first transmission path from the wireless access device to each user, and a second transmission path from the wireless access device to the each user through a reflection by the IRS, and wherein $f$ denotes carrier frequency, and d denotes distance, j denotes an index of an antenna of an access point, k denotes an index of a current user;
    S4: inputting initial conditions to a resource scheduling formula;

S5: inputting a channel state obtained from a channel state matrix $H_{JK}$ to a proximal policy optimization (PPO) algorithm, wherein J denotes a number of antennas, and K denotes a number of users;

S6: calculating an estimate of a gradient according to an obtained new policy parameter set θ and a generated scheduling action;

S7: updating primal-dual variables by using a primal-dual optimization algorithm, until a reward converges;

S8: outputting an action obtained after learning, a scheduled BWP factor β and a power p, and a final system performance function $f_0(x)$, wherein x denotes an ergodic mean;

S9: traversing the users, and repeating step S2 to step S7, to complete a scheduling for the users; and S10: terminating the BWP and power scheduling method process, and fetching data.

2. The BWP and power scheduling method according to claim 1, wherein in step S3, channel estimations are integrated:

$$H_{j,k} \triangleq H_{LOS,j,k} + H_{j,r}\Phi H_{r,k},$$

to unify the first transmission path and the second transmission path;

wherein $H_{j,k}$ is a first channel gain from the wireless access device to the each user, $H_{r,k}$ is a second channel gain from the IRS to the each user, $H_{j,r}$ is a third channel gain from the wireless access device to the IRS, $\Phi$ is a phase transition matrix, and $H_{LOS,j,k}$ is a fourth channel gain without passing through the IRS.

3. The BWP and power scheduling method according to claim 1, wherein in step S4, the resource scheduling formula is expressed as a long-term instantaneous system performance function using the ergodic mean x capture system: x≤E[f(p(h),h)], wherein f(p(h),h) is an instantaneous performance function, wherein h denotes a channel state.

4. The BWP and power scheduling method according to claim 1, wherein in step S5, the channel state is inputted to an actor part and a critic part of the PPO algorithm, wherein the actor part generates a new policy function, and selects a Gaussian policy to output a choice for scheduling of the action, and the critic part generates a new action according to an original Q value function, to schedule a BWP factor.

5. The BWP and power scheduling method according to claim 1, wherein in step S6, the estimate of the gradient is calculated according to the obtained new policy parameter set θ and the generated scheduling action:

$$\hat{\nabla} f_0(x_0) := \frac{\hat{f}_0(x_0 + \alpha_1 \hat{x}_1) - \hat{f}_0(x_0)}{\alpha_1} \hat{x}_1,$$

$$\hat{\nabla} f_2(x_0) := \frac{\hat{f}_2(x_0 + \alpha_2 \hat{x}_2) - \hat{f}_2(x_0)}{\alpha_2} \hat{x}_2^T,$$

$$\hat{\nabla}_\theta E[f_1(\pi(h, \theta), h)] := \frac{\hat{f}_1(\pi(h, \theta_0 + \alpha_3 \hat{\theta}), h) - \hat{f}_1(\pi(h, \theta_0), h)}{\alpha_3} \hat{\theta}^T;$$

wherein $x_0, \theta_0$ are given points, $\hat{x}_1, \hat{x}_2, \hat{\theta}$ are sampling points, $\alpha_1, \alpha_2, \alpha_3$ are iteration factors of a gradient estimation;

h is the channel state; π(h,θ) is an allocation policy;

$\hat{f}_1(\pi(h,\theta),h)$ is an observation value of an instantaneous system performance function;

$\hat{f}_2(x_0)$ is an observation value of a constraint function;

$\hat{f}_0(x_0)$ is an observation value of a target function; and $\hat{\nabla} f_0(x_0), \hat{\nabla} f_2(x_0), \hat{\nabla}_\theta E[f_1(\pi(h,\theta),h)]$ are gradient observation values obtained through a calculation; and in step S7, Lagrangian operators $\lambda_{k+1}$ and $\phi_{k+1}$ are updated based on step sizes $\gamma_1, \gamma_2, \gamma_3, \gamma_4$, and a Lagrangian operator updating formula is as follows:

$$\theta_{k+1} = \theta_k + \gamma_1 \hat{\nabla}_\theta E[f_1(\pi(h, \theta_k), h)\lambda_k],$$

$$x_{k+1} = x_k + \gamma_2 (\hat{\nabla} f_0(x_k) + \hat{\nabla} f_2(x_k)\phi_k - 1),$$

$$\lambda_{k+1} = \lambda_k - \gamma_f (\hat{f}_1(\pi(h, \theta_{k+1}), h) - x_{k+1}),$$

$$\phi_{k+1} = \phi_k - \gamma_4 \hat{f}_2(x_{k+1}),$$

$\theta_k$ is a parameter set of a $k^{th}$ cycle;

$x_k$ is an ergodic mean of the $k^{th}$ cycle; and $\lambda_k, \phi_k$ are Lagrange multipliers of the $k^{th}$ cycle.

* * * * *